United States Patent Office 3,519,824
Patented July 7, 1970

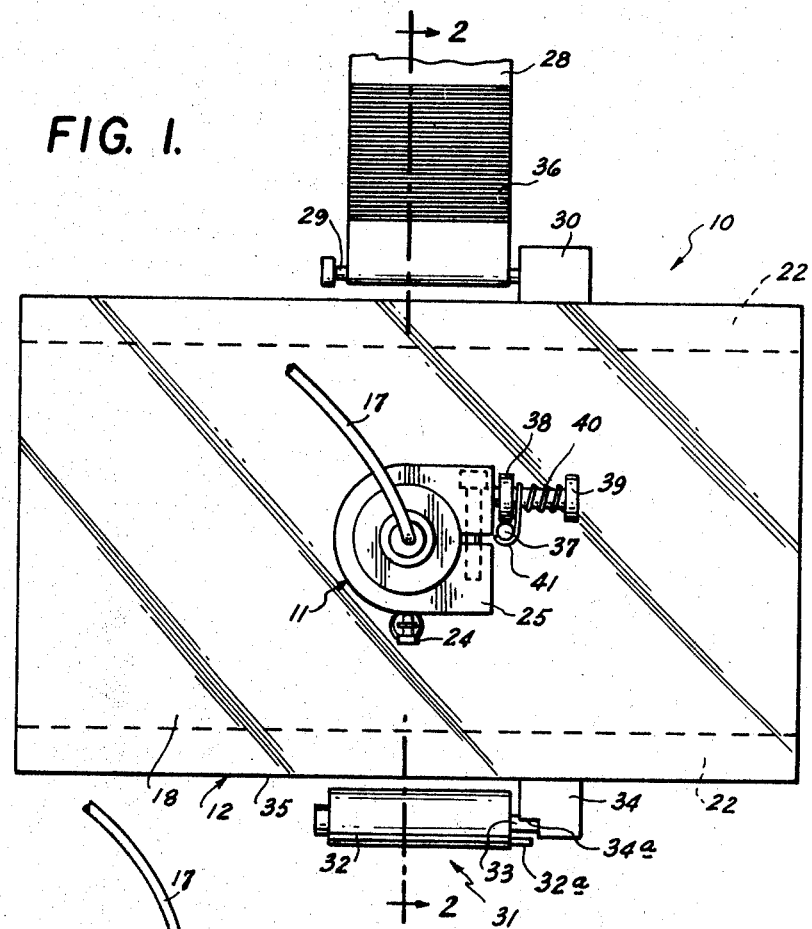
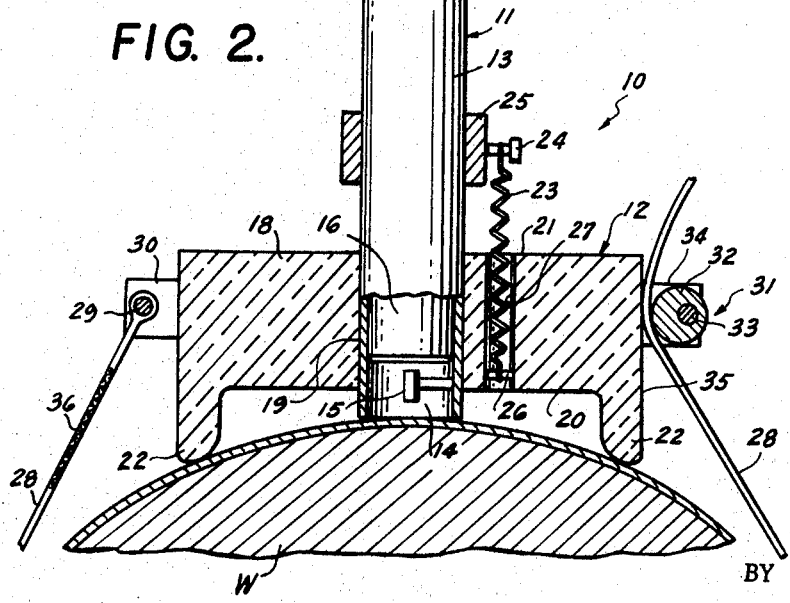
INVENTORS
JACQUES J. WEINSTOCK
WILLIAM D. HAY
ATTORNEY

3,519,824
GUIDE FOR PROBE ASSEMBLY OF PORTABLE RADIATION BACKSCATTER MEASURING INSTRUMENT
Jacques J. Weinstock, Flushing, and William D. Hay, Peekskill, N.Y., assignors to Unit Process Assemblies, Inc., New York, N.Y., a corporation of New York
Filed Mar. 14, 1966, Ser. No. 533,926
Int. Cl. G01t 1/16
U.S. Cl. 250—83.3                                        1 Claim

ABSTRACT OF THE DISCLOSURE

A portable radiation backscatter measuring instrument for measurement use on curved surfaces constituted by a transparent workpiece engaging base member adapted to position a probe element normal to the surface being measured and auxiliary biasing means to maintain the probe in uniform contact with the workpiece surface irrespective of the curvature thereof.

---

This invention relates generally to instruments employing beta-radiation backscatter techniques for measuring the thicknesses of thin layers or coatings of one substance on a base material or substrate having a significantly different atomic number.

In instruments of the described type, radiation from a suitable beta-emitting isotope is directed against a surface of the workpiece or sample to be measured, and a detector, for example, a Geiger tube, picks up the beta-radiation backscattered from the workpiece and transmits corresponding signals to a suitable electronic system for interpretation and translation into readings on a meter. The intensity of the backscattered radiation is proportional to the atomic number of the material at the surface of the workpiece aagainst which the radiation is directed and, where the workpiece has a coating substance of an atomic number different than that of the base material or substrate, the intensity of the backscattered radiation is further proportional to the thickness of the coating.

Comparison of the values obtained by the above procedure with the values from known thickness standards lead to quantitative measured results. Thus, through such comparative measurement techniques, the meter readings can be calibrated to indicate the thicknesses of various coating substances on various base materials.

When the workpiece is heavy or large, or when the thickness measurement is to be effected thereon in an assembled location, the workpiece cannot be brought to and placed on a support table, for example, as in the measuring instruments disclosed in U.S. Pat. No. 3,115,-577, issued Dec. 24, 1963, to B. B. Joffe et al., or in U.S. Pat. No. 3,132,248, issued May 5, 1964, to V. L. Eggebraaten et al. Thus, instruments for measuring coating thicknesses on a workpiece in situ have been provided with a portable probe assembly that includes a hand-held casing containing a radiation source and a detector for the radiation backscattered from a workpiece exposed to radiation from the source through one end of the casing held against the workpiece. However, in the use of such portable probe assemblies, difficulty is experienced, on curved workpiece surfaces, in maintaining the standard distance between the surface exposed to radiation and the source and detector within the probe casing necessary to secure accuracy of the thickness measurement.

Accordingly, it is an object of this invention to provide the probe assembly of a portable radiation backscatter measuring instrument with a guide which serves to hold the probe casing normal to the surface of a workpiece and in uniform contact therewith irrespective of the curvature of the workpiece surface exposed to the radiation, thereby to maintain accuracy and reproducibility of the thickness measurement.

In accordance with an aspect of this invention, a probe assembly including an elongated casing having an exposure opening at one end and containing a radiation source and a detector for the backscattered radiation from a workpiece exposed to radiation from the source through the open end of the casing, is provided with a guide that comprises a body having spaced projections extending from a face thereof for stable bearing against a workpiece surface which may be curved and a bore extending through the guide body and opening at the face of the latter between its projections for slidably receiving the probe casing, and spring means acting on the casing to urge the latter relative to the body in the direction to extend the open end of the casing beyond the face of the body for uniform contact with a workpiece surface against which the projections bear irrespective of the curvature of the workpiece surface.

In the case of an instrument for measuring the thicknesses of coatings on relatively large cylindrical workpieces, for example, rotogravure cylinders, the projections of the guide body are preferably in the form of parallel ribs extending along opposed margins of the face of the body and the bore which receives the probe casing is disposed midway between such ribs and extends normal to a plane containing the edges of the ribs so that, when the ribs contact the surface of a cylindrical workpiece, the probe casing is directed radially with respect to the workpiece.

In accordance with another feature of this invention, the guide for a probe assembly has securing means extending from the guide body to encircle a cylindrical or other workpiece and to urge the guide body against the workpiece surface with a force greater than that exerted by the spring means tending to project the casing beyond the face of the guide body. Such means for securing the guide body to the workpiece may conveniently include a strap assembly secured at one end to one side of the guide body and clamp means carried by the guide body at its other side to adjustably receive the free end portion of the strap assembly which preferably includes an extensible portion having a resistance to longitudinal extension thereof that is greater than the force exerted by the spring means to urge the probe casing relative to the guide body.

The above, and other objects, features and advantages of the invention, will be apparent in the following detailed description of an illustrative embodiment thereof which is to be read in connection with the accompanying drawing, wherein:

FIG. 1 is a top plan view of the probe assembly and guide of a portable radiation backscatter measuring instrument in accordance with an embodiment of this invention; and FIG. 2 is a sectional view taken along the line 2—2 on FIG. 1 and illustrating the use of the instrument for the measurement of coating thicknesses on a cylindrical workpiece.

Referring to the drawing in detail, it will be seen that a portable radiation backscatter measuring instrument 10 embodying this invention generally comprises a probe assembly 11 and a guide 12.

The probe assembly 11 includes an elongated casing 13 which may be cylindrical, as shown, and which has an opening 14 at one end (FIG. 2). A beta-ray emitting isotope or other source is contained in a source holder assembly 15 which is supported within casing 13 adjacent the open end thereof so that radiation from such source will be directed toward the surface of a workpiece W against which open end 14 abuts. Casing 13 further contains a detector 16, for example, a Geiger tube of the pencil type which is shielded from direct radiation by the source holder assembly 15. Detector 16 picks up the beta-radiation backscattered from the workpiece W through open end 14 and transmits corresponding signals, for example, through a cable 17 extending from casing 13, to a suitable electronic system (not shown) at which such signals are interpreted and translated into readings on a calibrated meter.

In accordance with this invention, the guide 12 for probe assembly 11 includes a body 18 which may be rectangular, as shown, and which has a central bore 19 extending at right angles to the lower face 20 of body 18 and opening at such lower face and at the opposed or upper face 21 of the body. Casing 13 is slidably disposed in bore 19 so as to expose its open end 14 at face 20 of the guide body. The guide body 18 further has spaced projections 22 extending from face 20 and having bore 19 opening therebetween. In the illustrated embodiment, projections 22 are in the form of parallel ribs extending along the opposite margins of face 20 and having the axis of bore 19, and hence of probe casing 13, located midway therebetween.

It will be apparent that projections 22 of body 18 are adapted to abut against the surface of a workkpiece W at relatively widely spaced lines of contact with the latter, thereby to provide a stable base for maintaining the axis of probe casing 13 normal to the workpiece surface. Where the workpiece W is cylindrical or otherwise has a curved surface, as shown on FIG. 2, such surface will extend more or less into the recess defined between projections 22 and face 20, but the body 18 will nevertheless maintain probe casing 13 with its axis normal to such curved surface at its intersection therewith, that is, extending radially with respect to a cylindrical workpiece.

In order to ensure that the open end 14 of casing 13 will be held in secure contact with the surface of the workpiece against which projections 22 abut, irrespective of the curvature of such surface and the extent to which the same extends into the recess defined between projections 22 and face 20, casing 13 is urged axially relative to body 18 in the direction to project the open end of the casing beyond face 20. The force for thus urging casing 13 relative to body 18 may be exerted by a spring 23 connected at one end to an anchor 24 extending from a clamp 25 which is secured on casing 13 above body 18 and is adjustable along the casing. The other or lower end of spring 23 may be connected to a pin 26 (FIG. 2) which extends across the lower end portion of a bore 27 formed in body 18 to receive the spring. It will be apparent that engagement of clamp 25 with the upper surface 21 of body 18 limits the projection of end 14 of casing 13 beyond face 20, so that the extent of such projection can be varied by adjusting a clamp 25 along casing 13.

Clamp 25 is normally adjusted to a position on casing 13 at which the open end 14 of the casing can project beyond face 20 by a distance that is at least equal to the extension of projections 22 beyond that face, whereby open end 14 of the casing will be engageable with a workpiece surface against which projections 22 abut, even when the workpiece surface is planar.

When body 18 is urged toward a workpiece surface, which may be curved as shown, by a force greater than that exerted by spring 23, end 14 of casing 13 initially contacts the workpiece surface and the casing is moved relative to body 18 so as to more or less retract the casing into bore 19 until projections 22 came into simultaneous bearing engagement with the workpiece surface. The spring 23 ensures that the contact pressure of end 15 of the casing against the workpiece surface will be uniform for all thickness measurements, even when the workpieces being measured have surfaces of different curvatures.

While the necessary force for urging body 18 toward the workpiece for abutting engagement of projections 22 with the workpiece surface in opposition to the force of spring 23 may be provided by making body 18 of sufficient mass and weight to effect the same, the illustrated and preferred embodiment is provided with a strap assembly 28 to effect such result. The strap assembly has one end secured, as on a pivot 29 carried by a bracket 30, to one side of guide body 18, while the other or free end portion of the strap assembly 28 is adapted to be adjustably secured to the opposite side of guide body 18 by a clamp assembly 31. As shown, the clamp assembly 31 may include a clamping roller 32 eccentrically rotatable on a shaft 33 carried by a bracket 34 suitably secured to the side of body 18, with the axis of shaft 33 extending parallel to the adjacent side surface 35 of body 18. It will be apparent that turning of roller 32 either increases or decreases the width of the gap between its surface and the adjacent side surface 35, thereby to either release or clamp the strap assembly 28 when the latter is disposed in such gap. The bracket 34 may have a semi-circular cutout 34a at the side facing toward roller 32, and a pin 32a projects axially from roller 32 into cutout 34a. Thus, pin 32a is selectively engageable with the radial end faces of cutout 34a to limit rotation of roller 32 at positions to the maximum and minimum gap between the surface of roller 32 and the adjacent surface 35.

The strap assembly 28 preferably includes an elastic or resiliently extensible section 36 having a resistance to the longitudinal extension thereof that is greater than the force exerted by spring 23.

In order to hold casing 13 against turning in bore 19 of guide body 18, a post 37 (FIG. 1) may project upwardly from body 18 parallel and adjacent to bore 19, and is engaged by a roller 38 rotatably carried by a shaft 39 extending from clamp 25 at right angles to post 37. Shaft 39 further carries a helical spring 40 having a hooked end 41 that slidably embraces post 37 to hold roller 38 against the latter while permitting axial movement of casing 13 in bore 19.

In using the described instrument 10 for measurement of the coating thicknesses on cylindrical workpieces, for example, on rotogravure cylinders, body 18 is placed against the portion of the workpiece surface at which the measurement is to be made, and strap assembly 28 is passed around the cylinder and through the clamp assembly 31. When the strap assembly encircling the cylindrical workpiece is pulled tight through clamping assembly 31 and locked by roller 32 thereof, projections 22 of guide body 18 are made to bear against the surface of the workpiece to position casing 13 with its axis extending radially with respect to the cylindrical workpiece, while spring 23 ensures that open end 14 of the probe casing is held in contact with the workpiece surface irrespective of the radius of curvature thereof. Thus, when measurements are made on cylindrical workpieces having different diameters or surface curvatures, a uniform distance is maintained between the workpiece surface exposed to radiation at the open end 14 of the casing and the detector 16 within the casing. Such uniform distance between the workpiece surface and the source and detector ensures that the meter readings will be accurately related to the thicknesses of the coatings being measured.

If desired, guide body 18 may be formed of a transparent material, for example, of methyl methacrylate, so that the area of the workpiece surface covered by the open end 14 of the probe casing, and hence exposed to radiation, can be observed through the guide body. Such observation of the area of the workpiece surface against which the end of casing 13 abuts is desirable when the measurement of the coating thickness is to be effected at a particular area of the workpiece surface.

Although an illustrative embodiment of this invention has been described in detail herein with reference to the drawing, it is to be understood that the invention is not limited to that precise embodiment, and that various changes and modifications may be effected therein by one skilled in the art without departing from the scope or spirit of the invention, except as defined in the appended claim.

What is claimed is:

1. In a portable radiation backscatter measuring instrument for measuring the thickness of thin coatings disposed on the surface of large diameter cylindrically shaped workpieces, the combination of a probe assembly including
an elongated casing having an exposure opening at one end thereof and containing a radiation source and means for detecting radiation backscattered from a workpiece exposed to radiation from said source through said exposure opening therein, and a positioning guide for said probe assembly comprising
a transparent body member having spaced projections extending along opposed margins of a face thereof to bear gainst the surface of said cylindrically shaped workpiece and to position said face on spaced relation therewith,
said transparent body member having a bore extending therethrough opening at said face between said projections and sized to slidably receive said casing therein disposed radially of said workpiece surface and with the exposure opening containing end thereof engaged in interfacial relation with the surface of the workpiece,
spring means connected intermediate said casing and body member for selectively biasing the casing relative to said body member in the direction to extend said exposure opening containing end of said casing beyond said face and into uniform compressive contact with the surface of the workpiece against which said projections bear irrespective of the shape of such workpiece surface,
a strap member secured at one end to one side of said transparent body member sized to circumferentialy extend about said workpiece and including
an extensible portion having a resistance to longitudinal extension thereof that is greater than the biasing force exerted by said spring means urging said exposure opening containing end of said casing into compressive contact with the surface of said workpiece,
and clamp means carried by said body momber at the other side thereof to adjustably receive the other end portion of said strap member and to thereby compressively position said body member relative to said workpiece surface independent of the biasing force exerted by said spring means.

References Cited

UNITED STATES PATENTS 2,675,482   4/1954   Brunton.
2,962,591  11/1960  McNabb et al.
3,136,892   6/1964   Willett et al.

ARCHIE E. BORCHELT, Primary Examiner

U.S. Cl. X.R.

250—83.6